UNITED STATES PATENT OFFICE.

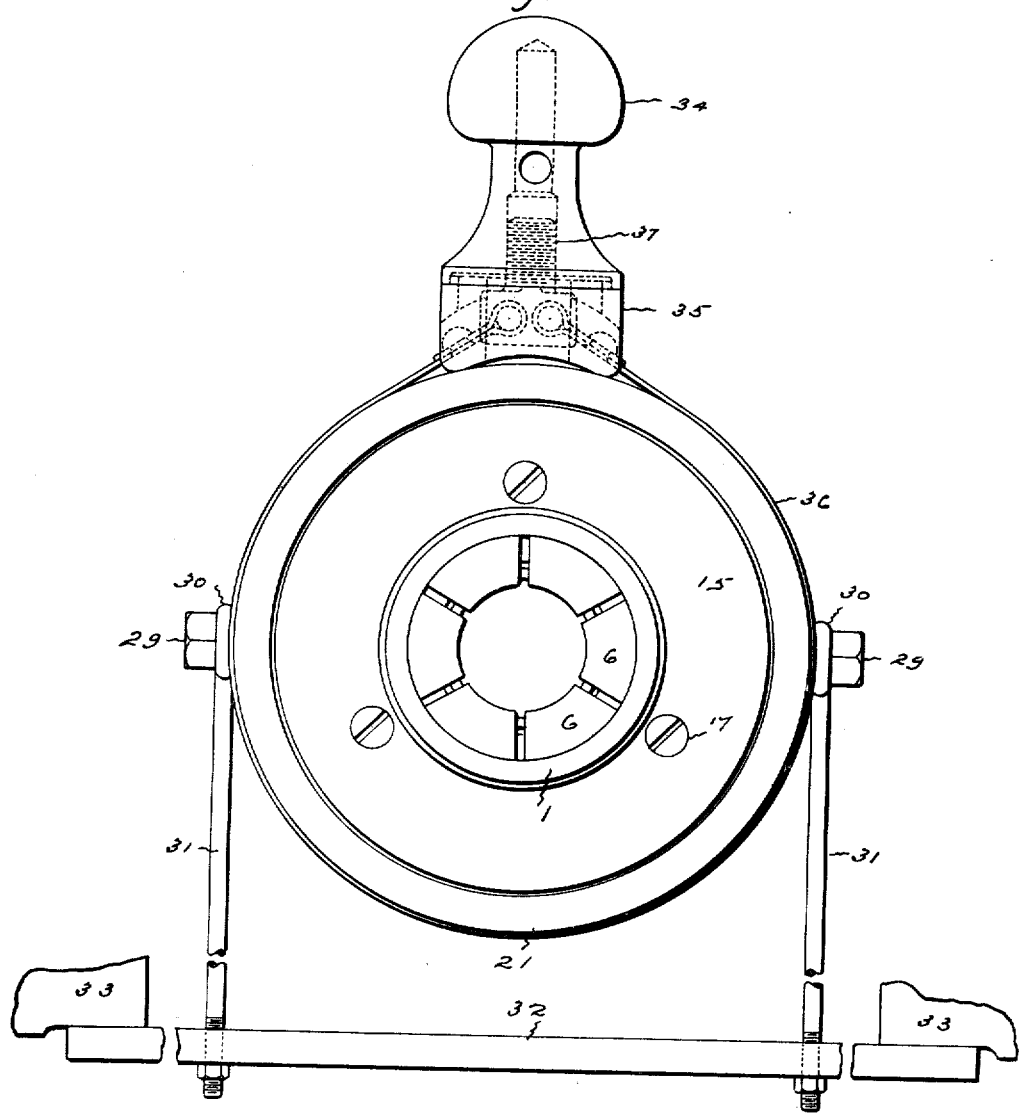

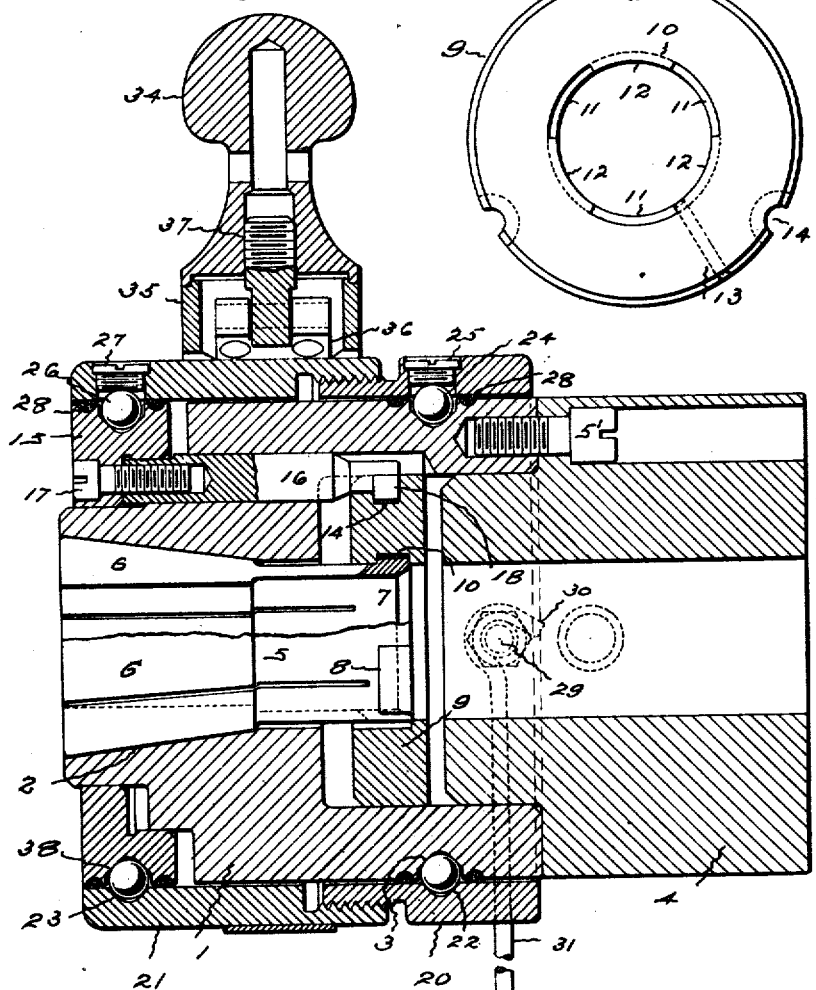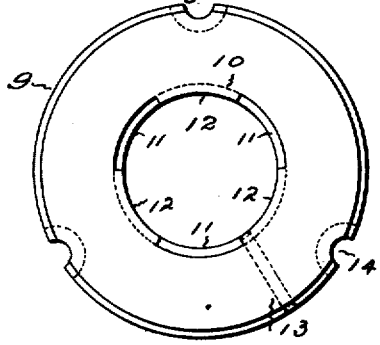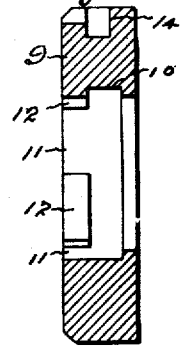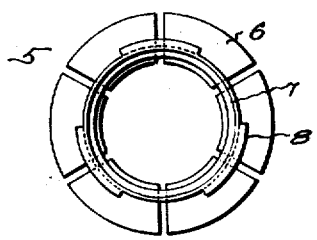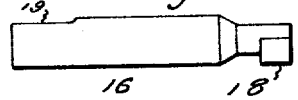

DONALD H. LAPOINTE, OF HARTFORD, CONNECTICUT.

COLLET-CHUCK.

1,359,077.  Specification of Letters Patent.  Patented Nov. 16, 1920.

Application filed November 14, 1919. Serial No. 338,005.

*To all whom it may concern:*

Be it known that I, DONALD H. LAPOINTE, citizen of the United States, residing at Hartford, in the county of Hartford and State of Connecticut, have invented a new and useful Improvement in Collet-Chucks, of which the following is a specification.

This invention relates to those chucks which have spring jaws that are closed for gripping the stock to be held by being drawn back into a tapering recess in the body, which chucks are more particularly designed to be applied to lathes and screw machines that are to be used for operating upon a large number of pieces of stock of substantially the same size, although of course the chucks may be employed for drill presses and similar machines and by providing several sizes of collets the chucks may be used for a considerable variety of sizes of stock.

The object of the invention is to produce a powerful, durable, accurate, free-running chuck of this class, which can be easily and quickly manipulated for opening and closing the jaws and which is relatively cheap to manufacture.

This object is attained by constructing the chuck with a rotatory body that is adapted to be connected with the machine spindle, the body having a tapering recess containing the spring jaw collet and carrying means for moving the collet inward and outward, said parts being mounted in a divided shell which comprises a rear section that is fixed against rotation and reciprocation and a front section that is held stationary when the chuck is in use, but has a rotatory and longitudinal adjustment on the rear section for projecting and retracting the collet, the rotatory and non-rotatory parts being locked together by friction reducing balls.

Figure 1 of the accompanying drawings shows a front view of the chuck that embodies the invention. Fig. 2 is a central longitudinal section of the chuck. Fig. 3 is a face view of the internal collet-shifting ring. Fig. 4 is a diametrical section of the internal ring. Fig. 5 is a view looking toward the smaller end of the collet. Fig. 6 is a side view of one of the rods employed for connecting the collet-shifting front ring and internal ring. Fig. 7 is an end view of the connecting rod.

The hollow cylindrical body 1 of the chuck which is desirably made of machine steel has a tapering recess 2 in its front end and a ball race 3 in its periphery near the rear end. Extending into and secured to the rear end of the body is a sleeve 4. This sleeve, which may be made of cast iron and be fastened by means of screws 5', is designed to be fitted to the spindle of the machine with which the chuck is to be used.

The collet 5 having any desired number of jaws 6 may be constructed in any suitable manner, preferably of hardened tool steel, with a central opening of approximately the diameter of the stock to be held and with the outer edges of its spring jaws inclined to fit the tapering wall of the recess in the body. On the exterior of the annular rear end 7 of the collet are three teeth 8. Encircling the rear end of the collet is the internal ring 9 which has in its inner wall a groove 10 shaped to receive the teeth on the rear end of the collet. The front wall of the internal ring around the groove is cut away as at 11 so as to leave three lugs 12. These parts are assembled by thrusting the collet teeth 8 through the ring openings 11 and then turning the collet until the teeth are located in the groove back of the lugs 12. A pin 13 may be inserted into the ring for limiting the turning of the collet. On the exterior of the internal ring are three pockets 14.

Encircling and sliding upon the front end of the body is the front ring 15 which has a ball race 38 in its periphery. The front ring and internal ring are connected by three rods 16 that extend through perforations in the body. The front ends of these rods fit in sockets in the inner wall of the front ring and are fastened therein by screws 17, and the rear ends of these rods are provided with lugs 18 shaped to fit into the pockets 14 in the edge of the internal ring. The rods near their front ends may be flattened off as at 19 to prevent them from turning when the lugs are located in the pockets. By moving the front ring in and out, through the medium of the rods and internal ring, the collet may be retracted into or projected out from the tapering opening in the body.

The rear section 20 of the shell that is provided with an exterior thread and the front section 21 of the shell that is provided with an interior thread are screwed together so that by turning one section and holding the other the total length of the shell may be increased or diminished. In the form of chuck illustrated the rear section is held stationary and the front section rotated. In the inner wall of the rear section is a ball race 22 and in the inner wall of the front section is a ball race 23. Balls 24 are inserted into the races 3 and 22 through a hole closed by a screw plug 25 so as to permit the body to rotate freely in the rear section of the shell but hold the parts from relative longitudinal movement, while balls 26 are inserted into the races 38 and 23 through a hole closed by a screw plug 27 so as to permit the front ring to rotate freely but cause it to move longitudinally with the longitudinal movements of the front section of the shell. Packing rings 28 may be placed between the parts each side of the balls to prevent the escape of lubricating grease put in the ball races.

To hold the rear section of the shell from rotation studs 29 may be set in the sides of the shell. These studs are engaged by hooks 30 at the ends of rods 31 that are adjustably secured to a strap 32 which is engaged with portions of the machine bed 33.

To turn the front section of the shell for the purpose of opening and closing the collet jaws it may be provided with a handle 34 which is rotarily mounted on a base 35 that rests upon the shell. The handle and its base may be clamped to the shell in any convenient position by means of a band 36 which encircles the shell and has its ends in the handle base connected with a screw 37 that is threaded into the handle. Rotating the handle one way loosens the band and permits the handle to be moved to the desired position, and then rotating the handle the other way tightens the band and binds the parts in the positions to which they are adjusted.

When the chuck is applied to a machine spindle and stock is inserted into the collet, by turning the handle in the proper direction the front shell section is rotated and drawn back on the rear shell section. This, through the balls 26, draws back the front ring which, through the connecting rods, forces back the internal ring and draws the collet into the body, the inclined wall in the recess of which causes the collet jaws to close on the stock. Turning the handle in the opposite direction reverses the movements of the parts and releases the stock.

The invention claimed is:—

1. A collet chuck comprising a hollow cylindrical body with a tapering axial recess, a collet with tapering spring jaws located in said recess, an internal ring movable in the body longitudinally thereof and engaging the collet, a front ring movable on the body longitudinally thereof, means connecting the rings, and a shell formed of two sections threaded together, one section being keyed to the body and the other section being keyed to the front ring.

2. A collet chuck comprising a hollow cylindrical body with a tapering axial recess, a collet with tapering spring jaws located in said recess, an internal ring movable in the body longitudinally thereof and engaging the collet, a front ring movable on the body longitudinally thereof, means connecting the rings, a shell formed of two sections threaded together, balls keying one shell section to the body and balls keying the other shell section to the front ring.

3. A collet chuck comprising a hollow cylindrical body with tapering axial recess, a collet with tapering spring jaws located in said recess, an internal ring movable in the body longitudinally thereof and engaging the collet, a front ring movable on the body longitudinally thereof, means connecting the rings, a shell formed of two sections threaded together, one section being keyed to the body and the other section being keyed to the front ring, means for holding one shell section against rotation and means for rotating the other shell section.

4. A collet chuck comprising a hollow cylindrical body with a tapering axial recess, a collet with tapering spring jaws located in said recess, an internal ring movable in the body longitudinally thereof and engaging the collet, a front ring movable on the body longitudinally thereof, means connecting the rings, a shell formed of two sections threaded together, one section being keyed to the body and the other section being keyed to the front ring, means for holding the rear shell section against rotation, and a handle for rotating the front shell section.

5. A collet chuck comprising a hollow cylindrical body with a tapering axial recess, a collet with tapering spring jaws located in said recess, an internal ring movable in the body longitudinally thereof and engaging the collet, a front ring movable on the body longitudinally thereof, means connecting the rings, a shell formed of two sections threaded together, one section being keyed to the body and the other section being keyed to the front ring, means for holding the rear shell section against rotation, a handle adjustable about the front shell section, and means for binding the handle to the front shell section.

6. A collet chuck comprising a hollow cylindrical body with a tapering axial recess, a collet with tapering spring fingers located in said recess, an internal ring movable in the body longitudinally thereof and engaging the collet, a front ring movable on the body longitudinally thereof, means connecting the rings, a shell formed of two sections threaded together, one section being keyed to the body and the other section being keyed to the front ring, means for holding the rear shell section against rotation, a band for encircling the front shell section, means for contracting said band upon the shell section, and a handle for operating said contracting means and for turning the shell section.

7. A collet chuck comprising a hollow cylindrical body with a tapering axial recess, a collet with tapering spring jaws located in said recess, an internal ring movable in the body longitudinally thereof and engaging the collet, a front ring section movable on the body longitudinally thereof, rods connecting the internal ring and the front ring, and a shell formed of two sections threaded together, one section being keyed to the body and the other section being keyed to the front ring.

8. A collet chuck comprising a hollow cylindrical body with a tapering axial recess, a collet with tapering spring jaws located in said recess, an internal ring movable in the body longitudinally thereof and engaging the collet, a front ring movable on the body longitudinally thereof, rods attached to the front ring and provided with lugs engaging pockets in the peripheries of the internal ring, and a shell formed of two sections threaded together, one section being keyed to the body and the other section being keyed to the front ring.

9. A collet chuck comprising a hollow cylindrical body with a tapering axial recess, a collet with tapering spring jaws at one end and exterior teeth at its other end located in said recess, an internal ring movable in said body longitudinally thereof, said ring being provided with lugs adapted to be engaged by said collet teeth, a front ring movable on the body longitudinally thereof, means connecting the rings, and a shell formed of two sections threaded together, one section being keyed to the body and the other section being keyed to the front ring.

10. A collet chuck comprising a hollow cylindrical body with a tapering axial recess, a collet with tapering spring jaws at one end and exterior teeth at its other end located in said recess, an internal ring movable in the body longitudinally thereof and having lugs in its interior engaging the collet teeth and pockets on its exterior, a front ring movable on the body longitudinally thereof, rods attached to the front ring and provided with lugs fitting the pockets in the periphery of the internal ring, and a shell formed of two sections threaded together, one section being keyed to the body and the other section being keyed to the front ring.

11. A collet chuck comprising a hollow cylindrical body with a tapering axial recess, a collet with tapering spring jaws located in said recess, means for moving the collet longitudinally in said recess, a shell formed of two sections threaded together, balls connecting one shell section with the body and balls connecting the other shell section with the means for moving the collet longitudinally.

12. A collet chuck comprising a body, a collet, means for moving the collet longitudinally in the body, and a surrounding shell formed of two sections threaded together, one section of said shell being connected with said body so as to permit relative rotation of the shell and body without relative longitudinal movement and the other section of the shell being connected with the means for moving the collet so as to permit of relative rotary movement of shell and body and also relative longitudinal movement of shell and body.

DONALD H. LAPOINTE.